United States Patent Office 3,776,826
Patented Dec. 4, 1973

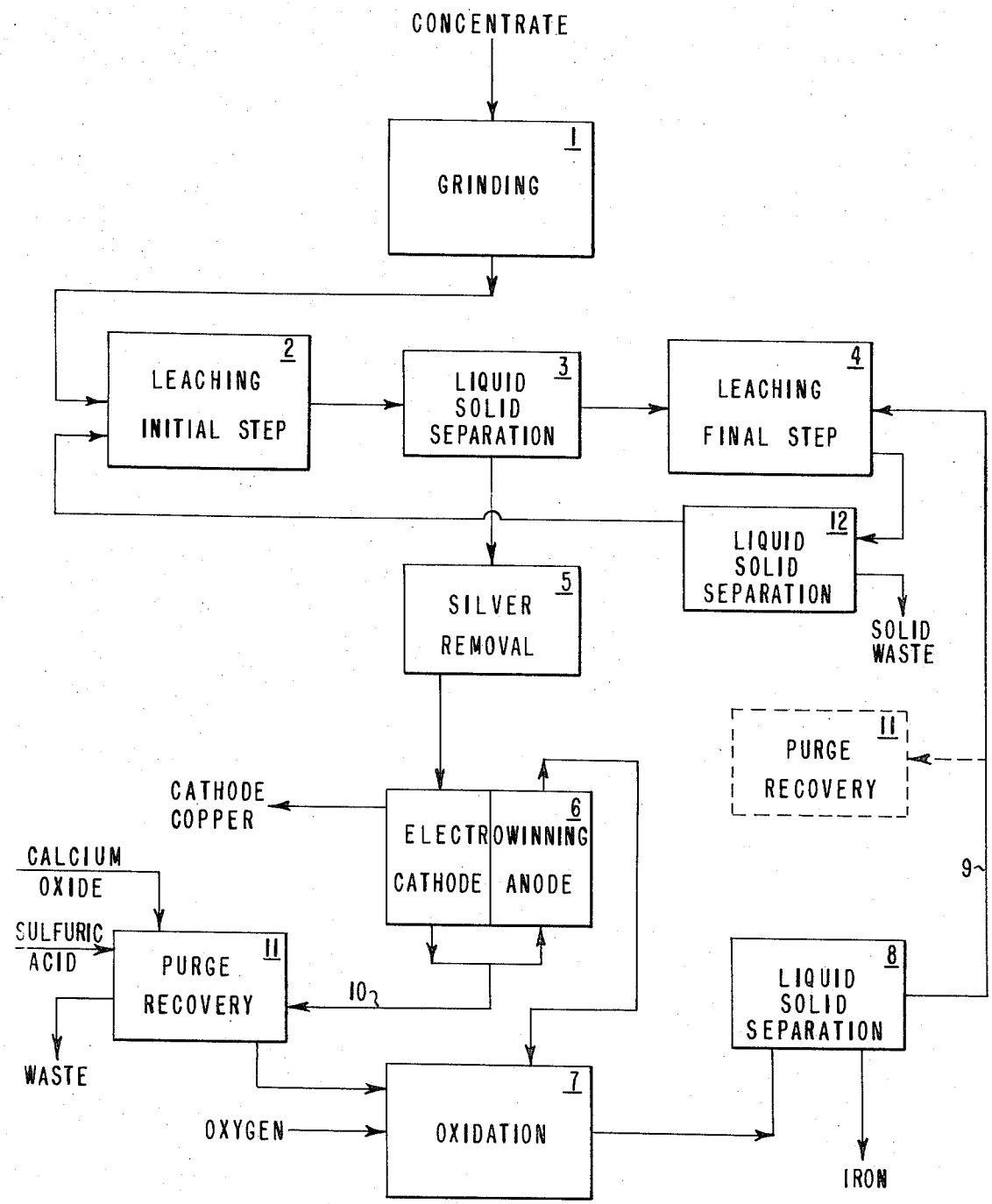

3,776,826
ELECTROLYTIC RECOVERY OF METAL VALUES
FROM ORE CONCENTRATES
Erdem Munir Atadan, Wilmington, Del., assignor to E. I.
du Pont de Nemours and Company, Wilmington, Del.
Filed July 19, 1972, Ser. No. 273,275
Int. Cl. C22b 15/08; C22d 1/12, 1/16
U.S. Cl. 204—107    15 Claims

ABSTRACT OF THE DISCLOSURE

A hydrometallurgical process to recover metal values e.g., copper from sulfide ore concentrates, e.g. chalcopyrite, bornite, and chalcocite characterized by (1) a staged countercurrent leaching of the concentrate with an aqueous solution containing cupric chloride with an excess of chloride ion with the solids from the initial step of leaching directed to the final step and the liquid from the final step being directed to the initial step while maintaining at least 3.5 and preferably at least 5 gram equivalents of chloride per kilogram of solution, (2) electrowinning a portion of the copper in the solution from the initial step from the catholyte compartment of an electrolytic cell having separate catholyte and anolyte compartments, (3) oxidizing the stream from the electrowinning step, and (4) recycling the liquid from the oxidation.

BACKGROUND OF THE INVENTION

Field of the invention

The present invention is directed to the recovery of metal values from low-grade ores and principally from those concentrates obtained by selective froth flotation of copper-bearing sulfide ores. Conventional processes for recovering metal values from low-grade ores and especially sulfide ores of copper have involved smelting of the concentrates and subsequent electro-refining. Hydrometallurgical processes are being investigated as alternatives to conventional smelting of the above ores principally to reduce atmospheric pollution.

Description of the prior art

It has been known for some time that copper and iron may be leached from a sulfide form of the metals by a solution of cupric chloride in a solvent for the resultant cuprous and ferrous chloride. In U.S. Pat. 552,960, issued Jan. 14, 1896, the basic reaction of cupric chloride with cupric sulfide is disclosed. U.S. Pat. 507,130, issued Oct. 24, 1893, discloses the same basic reaction and discusses, in addition, the leaching of silver sulfide. The patentee teaches that the presence of iron in electrowinning results in an impure metal and suggests that iron be removed by injecting air or oxygen into the pregnant solution prior to electrolysis to form the oxychloride of copper which acts as a precipitant for the iron oxide. Another disclosed advantage of such an oxidation was the regeneration of cupric chloride in the presence of acid. U.S. Pat. 704,639, issued on July 15, 1902, discusses the electrowinning of copper from a solution obtained by leaching argentiferous or cupriferous ores with a cupric chloride solution which is less than saturated with the chlorides of alkaline or alkaline earth metals. However, the patentee teaches that it is almost impossible to electrowin a homogenous copper except in the absence of cupric chloride and iron.

The present invention offers various advantages over the prior art in that a rapid and complete leaching is obtained by the staged countercurrent contact of leach solution and concentrate to provide a solution having sufficient cuprous ion therein to permit effective electrowinning of copper in a pure form with minimum power requirements. The present process removes iron in a readily filterable form with the minimum concomitant loss of copper.

SUMMARY OF THE INVENTION

Copper is recovered from sulfide ore concentrates containing minerals such as chalcopyrite ($CuFeS_2$), chalcocite ($Cu_2S$), bornite ($Cu_5FeS_4$), and covellite (CuS), and the like as well as from cement copper and from ore concentrates containing oxide copper minerals mixed with sulfide minerals by a hydrometallurgical process comprising:

(a) Leaching at a temperature of at least about 80° C. by contacting the concentrate with cupric chloride in an aqueous solution containing chloride ion in excess of that supplied by said cupric chloride in at least two steps with the solids from the initial step directed to the final step and the liquid from the final step being directed to the initial step, wherein sufficient cupric ion is introduced to the leaching to convert substantially all of the copper in said concentrate to soluble copper chlorides while maintaining reducing conditions in the initial step, e.g. by maintaining an excess of concentrate therein and an excess of cupric ion in the final step and maintaining at least 3.5 gram equivalents of chloride per kilogram of solution in each step;

(b) Separating the solids from the liquid after completion of the final leaching step and thereafter discarding said solids;

(c) Electrowinning a portion of the copper from the liquid obtained from the initial step of leaching from the cathode compartment of an electrolytic cell having separate catholyte and anolyte compartments while directing at least a portion of the partially depleted catholyte solution to the anolyte compartment;

(d) Contacting the liquid from step (c) with molecular oxygen while maintaining the molar concentration of the cuprous ion in said liquid no greater than the sum of the molar concentration of hydrogen ion and one-half of the molar concentration of the ferrous ion to precipitate a major portion of the iron leached from said concentrate and thereafter separating the liquid from the solid produced at a temperature above the crystallization temperature of said liquid; and (e) Recycling the liquid from (d) to the final step of leaching.

BRIEF DESCRIPTION OF THE DRAWING

Concentrate is ground in mill 1 and directed to the initial step of leaching 2 where it is contacted with a partially depleted leach solution from the final leaching step 4. The solids from the initial step of leaching are separated from the liquid and the solids are then contacted with the liquid in the final leaching step 4. The liquid from the liquid solid separator 3 is directed to silver removal 5 and thence to the cathode section of electrowinning 6 where substantially pure copper is recovered. The liquid from the anode section of electrowinning 6 is directed to an oxidation 7. The solids obtained from oxidation 7 are removed in separator 8 and the liquid from the separator is recycled via line 9 to the final leaching step 4. Impurity concentrations are controlled and residual copper is recovered by treating portion 10 of the stream from the electrowinning in purge recovery 11.

DETAILED DESCRIPTION OF THE INVENTION

The present invention involves three major steps, i.e. leaching, electrowinning and oxidation. The leaching provides substantially complete removal of soluble copper compounds from the ore, the electrowinning recovers substantially pure copper, and the oxidation removes iron while completing regeneration of the leach liquor.

Usually the starting material for the present invention is a high-grade copper and iron-containing sulfide concentrate obtained by selective froth flotation of copper-bearing sulfide ores. Such concentrates can contain nonferrous metals such as silver, zinc, nickel, tellurium, cobalt and cadmium in addition to copper and the present invention contemplates these metals. Since the leaching rate is increased by increasing the surface area of the mineral, it may be desirable to grind the concentrate to an optimum particle size for treatment in the process consistent with economical operation and solids handling in the process. Usually it is advantageous to grind the concentrate in a closed-circuit grinding mill 1 of conventional design so that about 95% will pass −325 mesh standard Tyler screen. The following is a discussion of the various steps of the present process and their integration. It is to be understood that the cuprous and cupric ions referred to herein exist as chloride complexes.

Leaching

The leaching dissolves essentially all of the copper in the concentrate in a manner such that the chloride solution from the initial stage of leaching contains only small residual amounts of cupric ion. The following is illustrative stoichiometry for the reaction of cupric chloride with common minerals in copper concentrates in descending order of reactivity.

Chalcocite
$$Cu_2S + 2CuCl_2 \rightarrow 4CuCl + S°$$
Chalcopyrite
$$CuFeS_2 + 3CuCl_2 \rightarrow 4CuCl + FeCl_2 + 2S°$$
Bornite
$$Cu_5FeS_4 + 7CuCl_2 \rightarrow 12CuCl + FeCl_2 + 4S°$$
Covellite
$$CuS + CuCl_2 \rightarrow 2CuCl + S°$$

The cupric ion acts upon other common minerals in concentrates the metal chlorides of which are soluble in concentrated chloride solutions, e.g.

$$ZnS + 2CuCl_2 \rightarrow ZnCl_2 + 2CuCl + S°$$

$$Ag_2S + 2CuCl_2 \rightarrow AgCl + 2CuCl + S°$$

$$PbS + 2CuCl \rightarrow PbCl_2 + 2CuCl + S°$$

Pyrite ($FeS_2$) does not react to any appreciable extent and molybdenite ($MoS_2$) is only partially leached.

As one skilled in the art appreciates, the reactivity and mineral content of common copper minerals will vary and thus require different conditions for optimum leaching.

Leaching is conducted in at least two steps with liquids from the latter steps contacting solids introduced in the initial step and solids from the initial steps contacting liquid introduced in the final step. Each leaching step can involve a plurality of reaction vessels preferably arranged so that the passage of liquid and solids between successive vessels is countercurrent. The preferred vessels are designed to provide a series of countercurrent zones of thorough liquid-solid contact with a minimum of back mixing, again with the preferred continuous flow of liquid and solids between the vessels.

In the initial step fresh (unreacted) concentrate is contacted with partially depleted solution from the subsequent leaching step(s). The temperature for this initial step of leaching is maintained at at least about 80° C. and preferably in the range 100–120° C. while the time of contact can vary from one-half to greater than two hours. The object in this initial step is to provide a solution containing only minor amounts of the cupric ion to provide maximum current efficiency in the subsequent electrowinning step and an excess of concentrate, preferably fresh concentrate, is therefore maintained in this initial step or, if more than one vessel is provided, at least in the vessel from which the liquid is withdrawn for eventual electrowinning. This arrangement permits reaction of the cupric ion at relatively low concentrations with substantially fresh concentrate, thereby maximizing the driving force for the reduction of the cupric ion. At least 50% concentrate in excess of that which could be completely leached by the available cupric ion in the leach solution is maintained in this initial leaching step. If more than one stage or vessel is employed in the initial leaching, then the excess concentrate in the vessel from which liquid is withdrawn for electrowinning can be considerably higher, e.g. 200% or more. The reduction of the cupric ion by this technique in the solution directed to electrowinning is influenced by the availability of materials which also react with the pregnant leach solution to reduce the concentration of the cupric ion. As discussed hereinbelow, the pregnant leach solution can be contacted with "cement" or scrap copper or equivalent reducing agent to effect such a reduction which technique would reduce the need for extended contact of the pregnant leach solution with excess concentrate. The solution from this initial stage should contain not more than 15 and preferably not more than 4 grams of cupric ion per liter of solution. The solution must be maintained above the crystallization temperature throughout this leaching and subsequent liquid/solids separation. The slurry from this initial stage or stages of leaching is then directed to one or more liquid/solids separators where a separation into clear solution and a concentrated slurry of solids is accomplished. When wet-ground chalcopyrite (73.57 $CuFeS_2$, 6.6% $FeS_2$, 1.3% ZnS, 9.1% gangue, 9.1% $H_2O$ and trace amounts of Ag and other metals) is leached according to the present process using ammonium chloride as the source of excess chloride, a typical liquid stream from this initial leaching step contains approximately 66.4% $H_2O$, 9.3% CuCl, 18.4% $NH_4Cl$, 2.9% $FeCl_2$, 2.3% $ZnCl_2$ and trace amounts of HCl and AgCl.

The solids (slurry) are then directed to at least one later step of leaching where the partially leached concentrate is contacted with liquid having an excess of cupric ion therein to maximize the rate and extent of removal of copper from the remaining solids. The leach solution in this latter stage is obtained by regenerating the liquid from electrowinning and removing iron and other undesirable metals as will be discussed hereinbelow. When chalcopyrite having the analysis set forth hereinabove is leached, this recycled leach solution contains approximately 67.7% $H_2O$, 10.6% $CuCl_2$, 19.3% $NH_4Cl$, 2.3% $ZnCl_2$ and 0.1% HCl.

The temperature in the later leaching step is maintained at substantially the same level as that in the initial step while the leaching time may be somewhat greater, for example, from one to greater than three hours in a process involving two steps of countercurrent leaching.

The cupric ion in excess of that required to dissolve the metal values in the partially leached concentrate introduced into this later leaching step should be on the same order as the excess concentrate introduced in the initial leaching step, i.e. at least 50% for a single leaching vessel to greater than 200% in the vessel from which the gangue and other wastes are withdrawn when more than one vessel is employed in this later leaching step. The solids from this later leaching stage are washed to recover soluble copper and chlorides and thereafter discarded. The average amount of copper in the discarded materials is less than 0.5% and often less than 0.2%. The material discarded typically contains 30.9% S, 7.9% $FeS_2$, 11.1% gangue, 0.2% $CuFeS_2$ and 49.8% $H_2O$.

In order to assure that the metal values which are leached remain in solution an excess of chloride over that present from the cupric chloride is maintained in the leaching step. The chloride in excess of that available from the cupric chloride may be obtained from any number of metal chlorides including, but not limited to, sodium chloride, ammonium chloride, calcium chloride, potassium chloride, zinc chloride and iron chloride. Ammonium chloride is preferred because it provides a pregnant liquor of low density and viscosity resulting in high mass transfer and easy liquid/solid separation. The use of ammonium chloride provides a solution of high electrical conductivity and yields a less dendritic copper deposit in subsequent electrowinning.

In both leaching steps it is necessary to maintain the concentration of chloride in the liquid solution above 3.5 gram equivalents of chloride and preferably above 5 gram equivalents of chloride per kilogram of solution to provide maximum solubility of product salts. Generally, optimum results are obtained at the highest practical temperature and with the highest cupric-to-copper mineral ratio in the concentrate in the last step and the opposite in the first step. It is preferred to leach in each stage at a temperature in the range of 100–120° C. at a total chloride concentration of 6 to 7 gram equivalents per liter with a pulp density in the range 3–15%. In the overall leaching step for a typical chalcopyrite concentrate about 5–10% excess cupric chloride is employed to minimize the residence time and thus the size of the leaching vessels. Suitable reactors for leaching include compartmented cylinders with means for agitation and a cocurrent flow of solution and solids from one compartment to the next. Materials of construction include titanium, steel lined with titanium or tantalum, or brick and rubber lined steel. Liquid/solid separation between steps can be accomplished with conventional disc filters having the metallic parts in contact with corrosive solutions made of titanium or any other suitably corrosion-resistant material.

The pregnant liquor from the leaching stage usually contains less than about 6 and often less than 4 grams per liter of cupric ion and therefore may be directed to electrowinning without further treatment. However, increased current efficiency in electrowinning may also be realized by contacting this pregnant leach solution with "cement" copper to permit the following reaction $$Cu^{++} + Cu^\circ \rightarrow 2Cu^+$$

After the optional treatment to reduce $Cu^{++}$, any metal, such as silver, which codeposits with copper during electrowinning can then be removed if desired by a modified electrowinning procedure in which the solution is maintained above about 30° C. and preferably 40–70° C. and electrolyzed employing a low current density, e.g. less than about 1.0 and preferably less than 0.1 ampere/ft.² Due to the low current density it is advantageous to employ a fluidized bed cathode or an equivalent arrangement which provides a high surface area for electrowinning the silver. The silver thus electrowon may be deplated into a chloride solution, e.g. $NH_4Cl$ and thereafter recovered from the solution by known methods. Under these conditions silver is preferentially plated from the solution to a concentration of less than about 1 p.p.m. before the solution is directed to the cathode compartment of an electrolytic cell.

Electrowinning

After leaching and optional silver removal the pregnant leach solution is directed to the cathode compartment of an electrolytic cell where the copper which is leached in the leaching step (approximately 20–30% of the total copper in the solution when chalcopyrite is being processed) is electrowon on the cathode and is then directed to the anode compartment where equivalent amounts of cuprous ion are oxidized to cupric ion. The cell is a standard type of agitated cell having a separator, i.e. a porous diaphragm or ion exchange membrane between the anode and cathode sections to prevent the anodic oxidation products, i.e. the cupric ion, from reaching the cathode, thereby reducing the current efficiency.

The reaction is shown by the following equation $$2CuCl \rightarrow Cu + CuCl_2$$

Agitation is accomplished, e.g. by dispersing nitrogen at the bottom of both electrodes. For ease of operation it is preferred to conduct the electrowinning at a temperature in the range of 40–60° C. The usual current density employed in electrowinning is about 10–30 amperes per square foot but with vigorous agitation, elevated temperature and the addition of agents such as gelatin and/or glue, the current density can be increased. As set forth above, ammonium chloride is preferred as the host electrolyte because its solutions have good electrolytic conductivity coupled with low density and viscosity. A typical analysis of the cathode copper obtained in the electrowinning step when the stream has been previously treated to reduce silver is as follows.

| Metal: | Concentration (p.p.m.) |
|---|---|
| Zn | <2 |
| Fe | 1 |
| Pb | <1 |
| Mg | 1.3 |
| Mn | 0.5 |
| Ni | <2 |
| Cd | <1 |
| As | 0.2 |
| Bi | <0.5 |
| Ag | 20 |
| Ca | 1 |
| Mo | <0.6 |
| Te | <2 |
| O | 100 |
| S | <5 |
| Al | <0.2 |
| Sb | 1 |
| Sn | <1 |

When no pretreatment to remove silver is employed the amount of silver in the copper will depend upon the silver/copper ratio in the concentrate, e.g. a typical concentrate containing 50–150 p.p.m. silver and 25–30% copper would result in electrowon copper containing 150–600 p.p.m. silver.

Oxidation

The liquid from the anode compartment of electrowinning is then directed to the oxidation step. The object of the oxidation is to regenerate cupric chloride solution for leaching and to precipitate iron oxide from the concentrated chloride solution in the form of a readily filterable precipitate containing minimum amounts of copper, thereby minimizing copper losses and the equipment size in the subsequent liquid solid separation. In the oxidation the following reactions can occur:

$$FeCl_2 + 2CuCl + \tfrac{3}{4}O_2 \rightarrow 2CuCl_2 + \tfrac{1}{2}Fe_2O_3$$
$$2CuCl + 2HCl + \tfrac{1}{2}O_2 \rightarrow 2CuCl_2 + H_2O$$

It is necessary to preclude the precipitation of cupric hydroxide (or cupric oxychlorides) in this step and to that end the molar concentration of the cuprous ion is maintained no greater than the sum of the molar concentration hydrogen ion and one-half of the molar concentration of the ferrous ion.

The oxidation can be conducted over a wide temperature range but the quality of the precipitate will depend upon the time that the precipitate is maintained at elevated temperature. If the oxidation is conducted at a temperature less than about 90° C. it is necessary to digest the precipitate for about 2–3 hours at a temperature of at least 90° C. and preferably 100–110° C. to obtain a readily filterable solid with minimum amounts of occluded copper.

The partial pressure of oxygen above the solution should be at least 5 p.s.i. and need not be greater than 50 p.s.i. while the time of oxidation can vary and in an agitated vessel can vary in the range 0.5 to 2 hours. Under the above conditions a readily filterable iron oxide is obtained which may be separated from the cupric chloride solution by filtration. The liquid is then recycled to the final leaching stage. Suitable equipment to conduct this operation includes a cylindrical reactor of suitably corrosion-resistant (e.g. titanium) parts in contact with the slurry. For continuous operation a series of cocurrent reactors can be employed as a single reactor compartmented to provide a series of agitated stages through which the slurry passes in cocurrent flow. The slurry is cooled by heat exchange with cooling water to a temperature at which filtration (e.g. disc filters made with suitably corrosion-resistant metal parts) can be accomplished in a conventional manner. Thorough washing of the cake with cooled water is required to recover copper values and leave a residue suitable for discard.

Purge

The buildup of undesirable metals in the present system is controlled by purging a portion of one of the recycle streams and removing and recovering metals where economics warrant. A preferred method for purging impurities from the present process involves a portion of the stream passing from the cathode to the anode in the electrowinning step 10. Approximately 2–10% of the stream from electrowinning is directed to an electrolytic cell where the major portion of the copper is removed following which the remaining copper is recovered by cementation on iron. After cementation the pH of the stream is increased with cooling or under pressure to approximately 10.0 with gaseous ammonia in the presence of oxygen whereupon iron hydroxide and aluminum hydroxide along with some magnesium and lead hydroxide precipitate but are not separated. The pH of the resultant slurry is then increased to approximately 11.0 by the addition of calcium oxide whereupon substantially all of the magnesium and lead hydroxides precipitate. All solids are then separated from the liquid. The pH of the liquid is then further increased to approximately 12.5 with additional calcium oxide and heated to approximately 105° C. whereupon zinc hydroxide mixed with zinc oxide precipitates and gaseous ammonia is evolved. The ammonia evolved in this step along with that evolved in previous steps is recycled. Sufficient sulfuric acid is then added to precipitate calcium as calcium sulfate which is separated from the liquid. The liquid is then directed to the oxidation step. Alternate purge techniques may be employed in the present process, e.g. a portion of the stream recycled to the leaching step 11 may be treated by known methods to remove and recover metal values. Trace amounts of other metals are removed from the present process via the gangue, iron oxide precipitate and the solid waste from the purge.

What is claimed is:

1. A hydrometallurgical process for recovery of metals from ore concentrates having copper, iron and sulfur therein which comprises
  (a) countercurrently leaching at a temperature of at least 80° C. by contacting said concentrate with cupric chloride in an aqueous solution containing chloride ion in excess of that supplied by said cupric chloride in at least two steps with the solids from the initial step directed to the final step and the liquid from the final step being directed to the initial step, wherein sufficient cupric ion is introduced to the leaching stages to convert substantially all of the copper in said concentrate to soluble copper chlorides while maintaining an excess of concentrate in the initial step and an excess of cupric ion in the final step and maintaining at least 3.5 gram equivalents of chloride per kilogram of solution in each step;
  (b) separating the solids from the liquid after completion of the final step of leaching and thereafter discarding said solids;
  (c) electrowinning a portion of the copper from the liquid obtained from the initial step of leaching from the cathode compartment of an electrolytic cell having separate catholyte and anolyte compartments while directing at least a portion of the catholyte liquid which is partially depleted in copper to the anolyte compartment;
  (d) contacting the liquid from step (c) with molecular oxygen while maintaining the molar concentration of the cuprous ion in said liquid no greater than the sum of the molar concentration of the hydrogen ion and one-half of the molar concentration of the ferrous ion to precipitate a portion of the iron leached from said concentrate and thereafter separating the liquid from the solid produced at a temperature above the crystallization temperature of said liquid; and
  (e) recycling the liquid from (d) to the final step of leaching.

2. The process of claim 1 wherein at least 50% excess of concentrate relative to the cupric ion is maintained in the initial step of leaching.

3. The process of claim 2 wherein the source of the excess chloride is ammonium chloride.

4. The process of claim 3 wherein said leaching is conducted at a temperature in the range 90–120° C. and the chloride concentration is maintained at at least 5 gram equivalents per liter.

5. The process of claim 4 wherein the source of excess chloride is ammonium chloride.

6. The process of claim 2 wherein the concentration of silver in the liquid obtained from the initial step of leaching is reduced before copper is electrowon therefrom in step (c).

7. The process of claim 1 wherein said leaching is conducted at a temperature in the range 90–120° C. and the chloride concentration is maintained at at least 5 gram equivalents per liter.

8. The process of claim 7 wherein about 5–10% excess cupric chloride is employed in the overall leaching step.

9. The process of claim 1 wherein about 5–10% excess cupric chloride is employed in the overall leaching step.

10. The process of claim 1 wherein the source of the excess chloride is ammonium chloride.

11. The process of claim 1 wherein the liquid in the anolyte and catholyte compartments is agitated during electrowinning.

12. The process of claim 1 wherein said contact of the liquid from step (c) with molecular oxygen is conducted at a temperature of at least 90° C. with a partial pressure of oxygen above the liquid of at least 5 p.s.i.

13. A hydrometallurgical process for recovery of metals from ore concentrates having chalcopyrite as the principal component thereof which process consists essentially of
  (a) countercurrently leaching at a temperature in the range 100–120° C. by contacting said concentrate in at least two steps with cupric chloride in an aqueous solution containing chloride ion from ammonium chloride in excess of that supplied by said cupric chloride; the solids from the initial step being directed to the final step and the liquid from the final step being directed to the initial step; introducing cupric ion to the leaching stages to convert substantially all of the copper in said concentrate to soluble copper chlorides; maintaining an excess of concentrate in the initial stage and an excess of cupric ion in the final stage with a 5–10% excess of cupric chloride in the overall leaching and maintaining 6–7 gram equivalents of chloride per liter of solution in each stage;

(b) separating the solids from the liquid after completion of the final step of leaching and thereafter discarding said solids;

(c) electrowinning about 20–30% of the copper in the liquid obtained from the initial step of leaching at a temperature in the range 40–60° C. from the cathode compartment of an electrolytic cell having separate catholyte and anolyte compartments while directing at least a portion of the catholyte liquid which is partially depleted in copper to the anolyte compartment;

(d) contacting the liquid from step (c) with molecular oxygen at a temperature of at least 90° C. and a partial pressure of oxygen above the liquid of at least 5 p.s.i. while maintaining the molar concentration of the cuprous ion in said liquid no greater than the sum of molar concentration of the hydrogen and one-half of the molar concentration of the ferrous ion to precipitate a mapor portion of the iron leached from said concentrate and thereafter separating the liquid from the solid produced in (c) at a temperature above the crystallization temperature of said liquid; and (e) recycling the liquid from (d) to the final step of leaching.

14. The process of claim 13 wherein the ratio of silver to copper in the liquid from the initial step of leaching is reduced before copper is electrowon therefrom.

15. The process of claim 14 wherein the said ratio is reduced by subjecting the liquid to electrolysis at low current density.

References Cited

UNITED STATES PATENTS 552,960  1/1896  Hoepfner _____ 204—107

FOREIGN PATENTS 22,030  12/1892  Great Britain _____ 204—107

JOHN H. MACK, Primary Examiner

R. L. ANDREWS, Assistant Examiner

U.S. Cl. X.R.

75—117; 204—111; 423—141, 633